Nov. 12, 1968   A. WINKLER ET AL   3,410,498
CINEMATOGRAPHIC APPARATUS
Filed Feb. 8, 1966   3 Sheets-Sheet 3

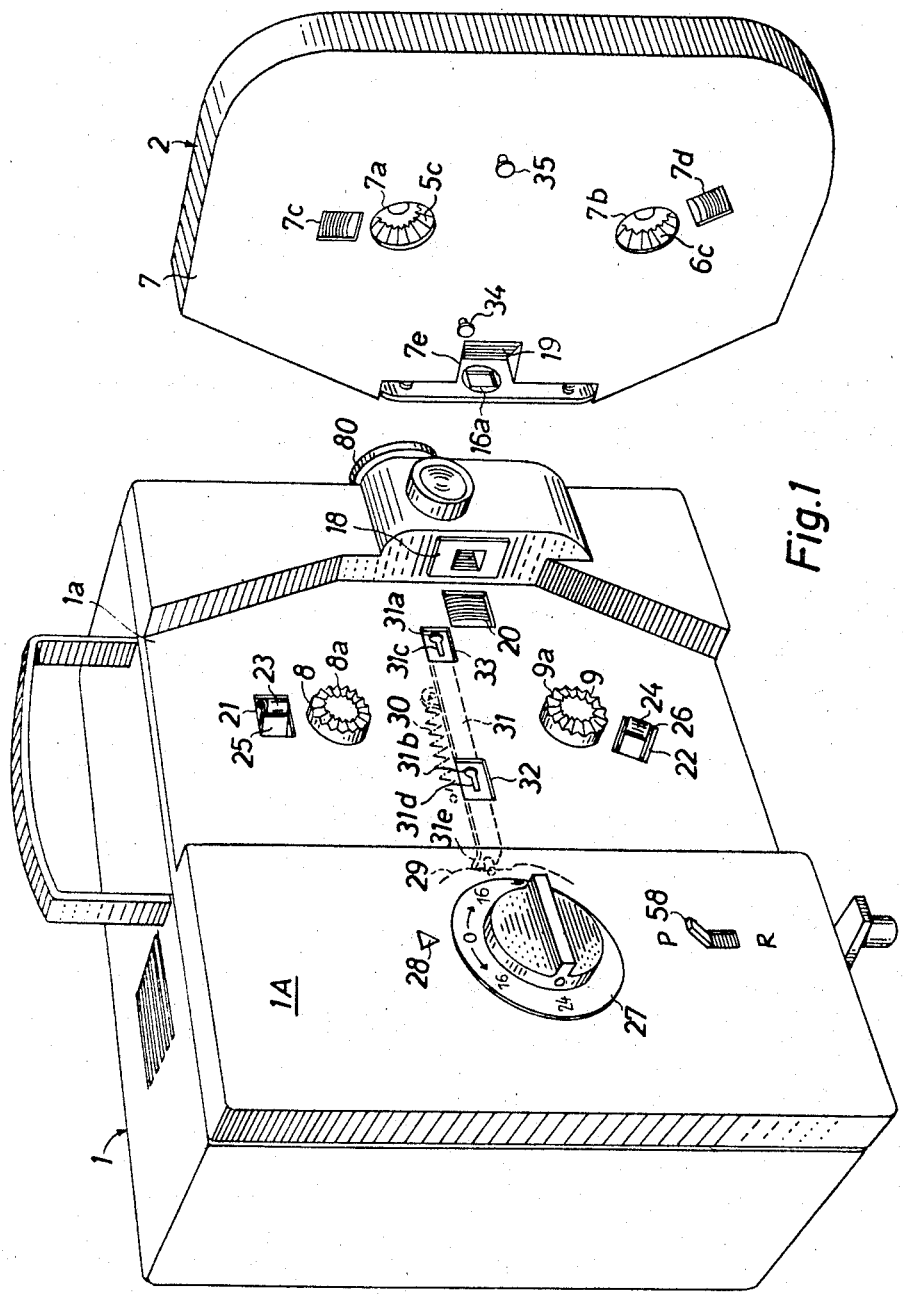

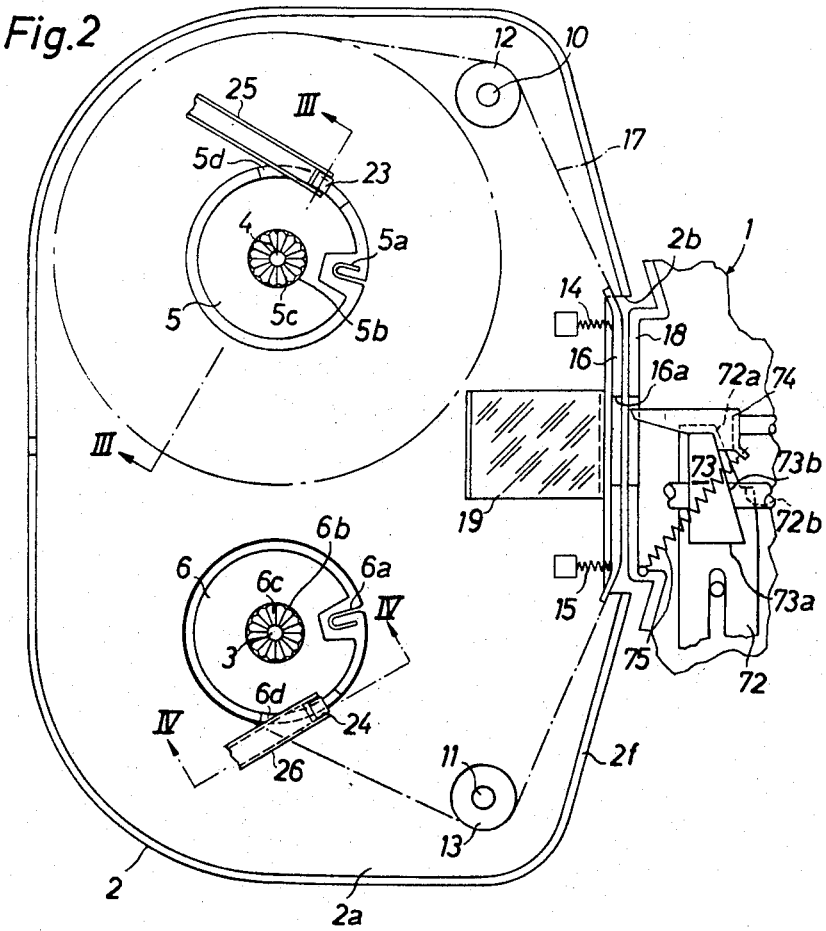
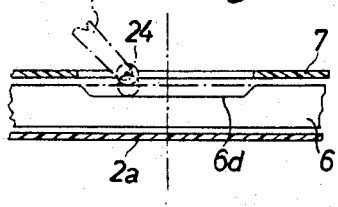
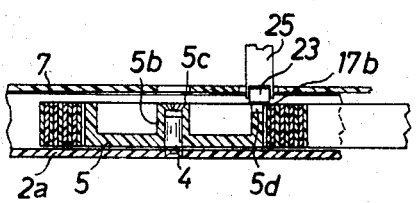

INVENTORS
ALFRED WINKLER
BY ERICH FILSINGER
KARL BAMMESBERGER

Michael S. Striker
Attorney

United States Patent Office 3,410,498
Patented Nov. 12, 1968

3,410,498
CINEMATOGRAPHIC APPARATUS
Alfred Winkler, Munich, Erich Filsinger, Unterhaching, near Munich, and Karl Bammesberger, Munich-Untermenzing, Germany, assignors to Agfa-Gevaert Aktiengesellschaft, Leverkusen, Germany
Filed Feb. 8, 1966, Ser. No. 525,877
Claims priority, application Germany, Feb. 26, 1965,
A 23,327
15 Claims. (Cl. 242—55.13)

ABSTRACT OF THE DISCLOSURE

A motion picture projector which can be coupled with a magazine containing two reels for exposed and developed motion picture film. The drive which transports the film is automatically coupled with the reels when the magazine is detachably secured to a side wall of the projector housing. Scanning members which track the edge faces of convoluted film on the reels arrest the drive when the supply of film on the respective reels is nearly exhausted.

The present invention relates to cinematographic apparatus in general, and more particularly to improvements in a motion picture projector or an analogous apparatus wherein a film is transported lengthwise from a supply reel to a takeup reel or vice versa. Still more particularly, the invention relates to improvements in cinematographic apparatus of the type wherein the two reels are rotatable in a magazine which is detachably supported by a housing and wherein the drive for the reels is mounted in or on the housing and is automatically arrested or disconnected from one of the reels when the supply of film on the other reel is almost exhausted.

In presently known cinematographic apparatus of which we are aware at this time, the arresting device for the drive is controlled by a scanning member which tracks the exposed surface of the outermost convolution of film on a supply reel and which causes the arresting device to arrest or to disconnect the drive from the takeup reel when the diameter of convoluted film on the supply reel is reduced to a predetermined value. A serious drawback of such apparatus is that the scanning member must be mounted for movement radially of the supply reel and must be capable of covering a distance which equals the difference between the minimum and maximum radii of convoluted film. Also, the scanning member should not exert a pressure which could result in scratching of or other damage to the film. As a rule, the drive should be arrested or disconnected just before the film is completely withdrawn from the supply reel so as to allow for full utilization of the film without, however, allowing for actual detachment of the trailing end from the core of the supply reel. It was found that the just described conventional control systems are very unreliable because the scanning member must cover a considerable distance from its radially outermost to its radially innermost position while the actual signal which causes the arresting device to arrest or to disconnect the drive is produced only when the scanning member approaches the radially innermost end of its path and changes its position by a distance corresponding to the thickness of the film. Furthermore, the scanning member must be mounted in the magazine and the apparatus must be provided with complicated, bulky and highly sensitive couplings which connect the scanning member with the arresting device. Each magazine must be provided with one or two scanning members which contributes considerably to the cost of such magazines.

Accordingly, it is an important object of the present invention to provide a novel cinematographic apparatus for use with removable two-reel film magazines wherein the scanning member or members which control the operation of the arresting device for the reel drive are constructed, assembled and mounted in such a way that they need not move radially of the reels and that they need not be mounted in the magazine whereby a single scanning member or a single set of scanning members may be used in connection with each of a series of magazines.

Another object of the invention is to provide an apparatus of the just outlined characteristics wherein the drive for the takeup reel is invariably arrested in such position that the supply reel still accommodates a predetermined length of film regardless of the overall length of film which was originally stored on the supply reel.

A further object of the invention is to provide a cinematographic apparatus wherein the scanning member or members are not likely to damage the film even if they are biased against the film by relatively strong springs.

An additional object of the invention is to provide a motion picture projector with a pair of scanning members which automatically arrest or disconnect the drive for the takeup or supply reel in good time before the trailing end of the film is actually separated from the respective reel.

Still another object of the invention is to provide a motion picture projector wherein the scanning members automatically assume optimum positions with reference to the film when the magazine which contains the two reels is properly attached to the housing of the projector.

A concomitant object of the instant invention is to provide a novel electric circuit which may be utilized in an apparatus of the above outlined characteristics and which may be interrupted or completed in automatic response to signals produced by the improved scanning members.

Briefly stated, one feature of our present invention resides in the provision of a cinematographic apparatus, particularly a motion picture projector, which comprises a housing, a film-containing magazine which is removably mounted on the housing, a pair of preferably flangeless reels rotatably mounted in the magazine, drive means provided in the housing for rotating the reels so that a supply of convoluted film on one of the reels is being transferred onto the other reel, arresting means provided in the housing and operative to arrest the drive means, and control means for operating the arresting means. The control means comprises a scanning member which is mounted in or on the housing and is adjacent to the one reel to track one edge face of convoluted film and to operate the arresting means when the length of convoluted film on the one reel is reduced to a predetermined minimum value.

In accordance with a presently preferred embodiment of our invention, the scanning member comprises a spring-biased roller which is movable axially of the one reel and tracks the innermost convolution of the film. The one reel can be provided with a recess which receives a portion of the roller when the innermost convolution is partially withdrawn whereby the roller is displaced and operates the arresting means for the drive to prevent further withdrawal of film just before the trailing end of the film is detached from the one reel.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of a specific embodiment with reference to the accompanying drawings, in which:

FIG. 1 is a perspective view of a motion picture projector which embodies our invention, the magazine being shown in detached position;

FIG. 2 is an enlarged side elevational view of the magazine, further showing the film gate and a portion of the claw pull-down;

FIG. 3 is a fragmentary section through the magazine, substantially as seen in the direction of arrows from the line III—III of FIG. 2;

FIG. 4 is a fragmentary section through the magazine, substantially as seen in the direction of arrows from the line IV—IV of FIG. 2.

Figure 5:
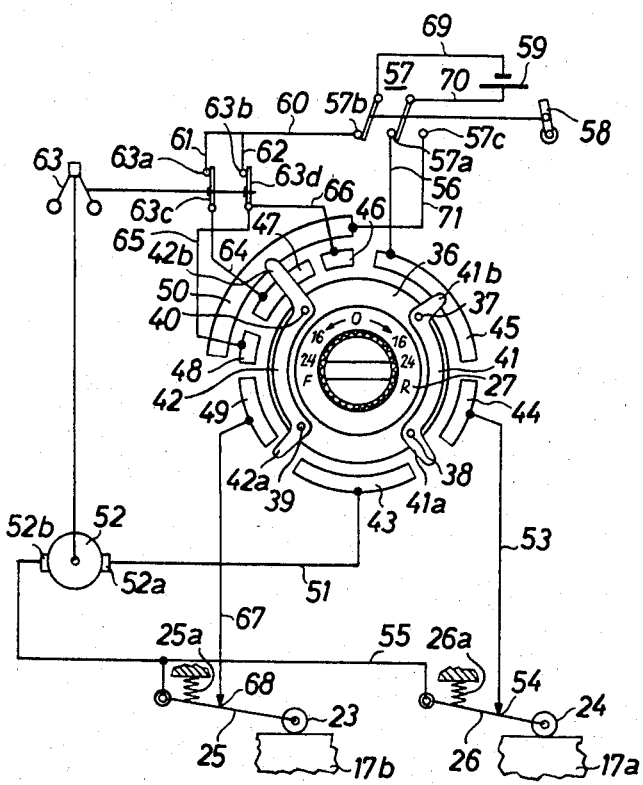
FIG. 5 is a schematic view which illustrates the electric circuitry of the projector.

Referring first to FIGS. 1 and 2, there is shown a motion picture projector which comprises a housing 1 having a side wall 1A which is provided with a recess or cutout 1a for a film magazine 2. The magazine 2 comprises a bottom wall 2a and a cover 7 which is detachable from the bottom wall 2a. The latter carries two bearing pins 3, 4 for the hubs or cores 6b, 5b of two flangeless spools or reels 6, 5, respectively. The peripheries of these reels are formed with curved anchoring or retaining channels 5a, 6a which can receive and retain the ends of a film 17. The exposed end portions of the hubs 5b, 6b are toothed or serrated, as at 5c and 6c (see particularly FIGS. 2 and 3) and the cover 7 is formed with circular apertures 7a, 7b which respectively register with the hubs 5b, 6b so that the toothed portions 5c, 6c are readily accessible from the outside. The housing 1 carries rotary coupling members 8, 9 whose end faces are provided with teeth 8a, 9a which can be brought into mesh with the toothed portions 5c, 6c when the magazine 2 is properly mounted on the housing 1. The coupling members 8, 9 then respectively extend through the apertures 7a, 7b. In a manner well known from the art of such projectors, the coupling members 8, 9 are biased by springs and are movable axially so that they can yield when the magazine 2 is attached to the housing 1 and thereupon cause their teeth 8a, 9a to move into mesh with the complementary toothed portions 5c, 6c.

The bottom wall 2a of the magazine 2 further carries two guide rolls 12, 13 which are rotatable on shafts 10, 11 and a pressing plate 16 which is biased by springs 14, 15. The film 17 is convoluted on the supply reel 5 and is trained around the guide rolls 12, 13 so that it extends in front of the pressing plate 16. The leading end of the film is anchored in the channel 6a of the takeup reel 6. The front end wall 2f of the magazine 2 is rigid with the bottom wall 2a and is formed with a window 2b which is located in front of the pressing plate 16 and may receive a film gate 18 which is carried by the housing 1. When the magazine 2 is properly mounted on the housing 1, the pressing plate 16 urges the film against the gate 18.

The bottom wall 2a further supports a mirror 19 whose reflecting surface makes an angle of 45 degrees with the optical axis of the projection lens 80. The purpose of the mirror 19 is to reflect light rays passing through an opening 20 of the housing 1 against the rear side of that film frame which is located behind the gate 18. The opening 20 registers with an opening or cutout 7e of the cover 7. The light rays which are reflected by the mirror 19 then pass through a cutout 16a of the pressing plate 16 and through that film frame which is located in front of the cutout 16a. The projection lamp (not shown) is mounted in the housing 1 behind the opening 20.

The side wall 1A of the housing 1 is formed with openings 21, 22 for two scanning members here shown as rollers 23, 24 which are respectively mounted at the free ends of spring-biased supporting arms 25, 26. The rollers 23, 24 respectively extend through registering openings 7c, 7d provided in the cover 7 so that these rollers can track the edge faces of innermost convolutions 17b, 17a on the reels 5 and 6. FIG. 3 shows that the roller 23 tracks the innermost convolution 17b of the film 17 on the reel 5 and that the marginal portion of the reel 5 has a peripheral cutout or notch 5d which can receive a portion of the roller 23 when the innermost convolution 17b is partially withdrawn from the reel 5. This causes the roller 23 to operate an arresting device 68 which will be described later whereby the arresting device stops a motor 52 which drives the reel 6. The notch 6d in the peripheral portion of the reel 6 is best shown in FIG. 4. This notch can receive a portion of the scanning roller 24.

The side wall 1A of the housing 1 further supports a rotary actuating member or knob 27 which can select various forward and reverse speeds for the drive. For example, the knob 27 can adjust the drive to move the film 17 forwards or backwards at a speed of 16 or 24 frames per second. When its zero graduation registers with a fixed index 28 on the side wall 1A, the knob 27 maintains the drive in idle position.

The knob 27 is connected with a disk-shaped cam 29 which can shift a reciprocable locking or fastening bolt 31 shown in FIG. 1. The bolt 31 is biased by a helical spring 30 which urges its bent-over follower 31e to track the face of the cam 29. Two circular openings 31a, 31b of the locking bolt 31 respectively communicate with elongated slots 31c, 31d. The purpose of the openings 31b, 31c is to permit passage of locking or fastening pins 34, 35 which are mounted on the cover 7 of the magazine 2. Once the heads of the pins 34, 35 have passed through the openings 31a, 31b, their stems can slide in the respective slots 31c, 31d whereby the magazine 2 is locked or secured to the housing 1. The locking bolt 31 is mounted behind the side wall 1A and this wall is formed with cutouts 33, 32 for the locking pins 34, 35. The arrangement is such that the openings 31a, 31b register with the heads of the pins 34, 35 only when the zero graduation on the knob 27 registers with the index 28. Thus, the magazine 2 is automatically locked to the housing 1 in each but the zero position of the knob 27. Prior to actual locking engagement between the bolt 31 and the pins 34, 35, the magazine 2 can be held in requisite position by the bias of springs 14, 15 which cause the pressing plate 16 to bear against the film gate 18 or to press the film 17 against the gate.

FIG. 5 shows that the shaft of the knob 27 supports and rotates a disk-shaped carrier 36 of insulating material which in turn supports two moving contacts 41, 42. These contacts are respectively fixed to the carrier 36 by rivets 37–38 and 39–40 and are respectively provided with resilient current-conducting end portions or tongues 41a, 41b and 42a, 42b. When the knob 27 is rotated by hand, the tongues 41a, 41b, 42a, 42b slide along selected fixed contacts 43, 44, 45, 46, 47, 48, 49 and 50, hereinafter called segments. The segments 43–50 are supported by the housing 1.

A first conductor 51 connects the segment 43 with one pole 52a of a reversible electric motor 52 which can drive the coupling member 8 or 9 to thereby rotate the reel 5 or 6. The segment 44 is connected with a conductor 53 which leads to a microswitch 54 constituting an arresting member for the motor 52 and being controlled by the scanning roller 24. When the roller 24 tracks the innermost film convolution 17a on the supply reel 6, the microswitch 54 is closed and cannot prevent the motor 52 from driving the reel 6. A conductor 55 connects the microswitch 54 with the other pole 52b of the motor 52.

The segment 45 is connected with a conductor 56 which is also connected with one fixed terminal 57a of a control switch 57 which can be actuated by a lever 58, see also FIG. 1. The control switch 57 is of the double-pole double-throw type. The lever 58 may be pivoted between a position P (projection) and a position R (rewind). Depending on the angular position of the lever 58, the operator can connect the fixed terminal 57a with the positive or negative pole of a source 59 of electrical energy. In the illustrated embodiment, the source 59 is constituted by a battery but it is equally possible (and normally preferred) to utilize a selenium or other rectifier which may be connected to a conventional source of A-C current.

A second fixed terminal 57b of the control switch 57 can be connected with a conductor 69 leading to the other pole of the source 59. The terminal 57b is further connected with conductors 60, 61, 62 the latter two of which are respectively connected with the fixed terminals 63a, 63b of a two-stage centrifugal speed controlling switch 63. In a manner well known from the art of movie projectors, the switch 63 can open the circuit of the motor 52 when the motor reaches a predetermined speed. The moving terminal 63c of the switch 63 will be pivoted away from the terminal 63a when the speed of the motor 52 exceeds a speed corresponding to a film speed of 16 frames per second. The moving terminal 63d will be moved away from the fixed terminal 63b when the speed of the motor 52 exceeds a speed which corresponds to a film speed of 24 frames per second. The terminal 63c is connected with a conductor 64 leading to the fixed segment 47. Conductors 65 and 66 respectively connect the terminal 63d with the segments 48 and 46.

A further conductor 67 connects the segment 49 with the microswitch 68 which is controlled by the scanning roller 23. The latter tracks the film on the reel 5 and opens the microswitch 68 when it enters the notch 5d of the reel 5 in response to partial withdrawal of the innermost film convolution 17b. The microswitch 68 is further connected with the conductor 55 and hence with the pole 52b of the motor 52.

FIG. 5 further shows a conductor 71 which connects the segment 50 with the fixed terminal 57c of the control switch 57. The conductor 56 or 71 may be connected with one pole of the source 59 through a further conductor 70.

It is now assumed that the lever 58 is in the "projection" position P and that the magazine 2 is properly positioned with reference to the housing 1, i.e., that the heads of the locking pins 34, 35 have passed through the circular openings 31a, 31b of the locking bolt 31. The operator then decides to operate the projector at a speed of 16 frames per second and rotates the knob 27 in a clockwise direction F (as viewed in FIG. 1 or 5) until the left-hand graduation "16" registers with the index 28. The knob 27 then causes the tongue 41b to slide along the segment 45 while the tongue 41a moves toward and slides along the segment 43. The pole 52a of the motor 52 is then connected with one pole of the source 59 through the conductors 70, 56 and 51. The tongue 42a engages the segment 49 while the tongue 42b remains in contact with the segment 47. The other pole 52b of the motor 52 is then connected with the other pole of the source 59 through the terminals 63a, 63c of the centrifugal switch 63 and via conductor 69. The circuit of the motor 52 is now completed and the latter begins to rotate to advance the film 17 from the supply reel 5 toward the takeup reel 6 at a speed of 16 frames per second.

If the operator then turns the knob 27 to move the left-hand graduation "24" on the knob into registry with the index 28, the tongue 42b slides past the segment 47 and onto the segment 46. This segment 46 is connected with the terminals 63b, 63d of the centrifugal switch 63 so that the motor 52 begins to rotate at a higher speed (24 film frames per second) but does not change the direction of its rotation so that the reel 5 continues to pay out the film 17. The remaining tongues 41a, 41b, 42a continue to engage the segments 43, 45 and 49 so that the pole 52a is still connected with the conductor 70.

If the operator decides to rotate the knob 27 in the clockwise direction R in order to move the right-hand graduation "16" of the knob into registry with the index 28 (projection in reverse at 16 frames per second), the tongue 41a engages the segment 44 and the tongue 42a engages the segment 43. The pole 52a of the motor 52 is then connected with the contacts 63a, 63c of the centrifugal switch 63 and with the conductor 69. The pole 52b is connected with the conductor 70 via conductors 55, 53, 56. By turning the right-hand graduation "24" of the knob 27 into registry with the index 28, the operator causes the tongues 42a, 42b to connect the pole 52a with the contacts 63b, 63d of the centrifugal switch 63 via conductors 51, 65 and segment 48. The direction in which the motor 52 rotates remains unchanged.

If the lever 58 is moved to the "rewind" position R, the conductor 56 is connected with the conductor 69 and the conductor 71 is connected with the conductor 70 so that the tongue 42b can conduct electric current from the segment 50 to the segment 43 or 49. The centrifugal switch 63 is bridged and the motor 52 can drive the reel 5 or 6 at a high speed in order to rapidly complete the rewinding operation. This means that the motor 52 will rotate at a full speed as soon as the "zero" graduation of the knob 27 is moved away from registry with the index 28, regardless of whether the knob 27 is turned in a clockwise or in a counterclockwise direction. The direction in which the motor 52 rotates is directly the opposite of that when the lever 58 is moved to the position P. The microswitch 54 or 68 opens the circuit in a fully automatic way as soon as the scanning roller 23 or 24 enters the corresponding notch 5d or 6d.

The control switch 57 is further connected with a blocking bar 72 which is shown in FIG. 2. This blocking bar 72 has a stop face 72a which then prevents the operation of a customary claw pull-down 74 which is biased by a helical spring 75. The pull-down 74 is operative when the lever 58 is moved to the position P and is then moved by the spring 75 in cooperation with a rotary cam 73 having a circumferential cam face 73a and a second cam face 73b. A stop shoulder 72b of the blocking bar 72 then holds the pull-down 74 away from the cam 73. Consequently, the pull-down cannot interfere with rapid rewinding of the film 17. Furthermore, the pull-down 74 is held against any movement so that the rewinding operation is practically noiseless. In normal operation the pull-down 74 enters the perforations of the film 17 and moves the film past the gate 18. In response to rapid rewinding of film, the pull-down 74 would reciprocate at a high speed which could produce considerable noise.

The operation of the improved movie projector can be controlled in a very simple way because the operator merely operates the knob 27 and/or the lever 58. For example, the lever 58 may be held in the position R when the magazine 2 is attached to the housing 1. The operator then turns the knob 27 to lock the magazine to the housing and to start the motor 52. If the film is convoluted in part on the reel 5 and in part on the reel 6, the motor immediately rewinds the film onto the reel 5 and is arrested by the microswitch 54 in response to a signal from the scanning roller 24. The lever 58 is then moved to the position P and the projection of images begins at the speed which has been selected by the knob 27. Such projection is terminated in a fully automatic way when the scanning roller 23 is allowed to enter the notch 5d of the supply reel 5. In the next step, the operator simply moves the lever 58 back to the position R to rapidly rewind the film onto the reel 5. Such rewinding is terminated by the microswitch 54 when the scanning roller 24 is allowed to enter the notch 6d of the takeup reel 6. The apparatus is then ready for renewed projection of images or for detachment of the magazine 2 from the housing 1 in response to placing of the "zero" graduation on the knob 27 into registry with the index 28 whereby the locking bolt 31 is uncoupled from the pins 34, 35.

A very important advantage of our improved motion picture projector is seen to reside in that the scanning rollers 23, 24 are movable in the axial direction of the reels 5 and 6. Therefore, the springs 25a, 26a (see FIG. 5) which bias the arms 25, 26 may be rather strong without the danger of bending, crinkling or otherwise damaging the film. Also, the scanning rollers 23, 24 are mounted in such a way that they need not travel through a large distance in order to open the switches 68 and 54. This is also due to the fact that the rollers 23, 24 are movable axially, rather than radially, of the respective reels. The notches 5d, 6d may be relatively shallow and their angular position with reference to the channels 5a, 6a is selected in such a way (see FIG. 2) that the motor 52 can be arrested in good time before the one or the other longitudinal end of the film is actually withdrawn from the respective channel. The circuit-opening action of the microswitches 68, 54 is instantaneous and invariably takes place when a predetermined length of film still remains on the reel because the springs 25a, 26a are preferably strong. Also, and since the scanning rollers 23, 24 are mounted in the housing 1, there is no need to connect them with the microswitches 68, 54 by means of couplings or other expensive and bulky motion transmitting connections which are utilized in conventional motion picture projectors. Each of the two scanning rollers 23, 24 automatically engages the innermost convolution of film on the respective reel when the magazine 2 is properly attached to the housing 1. The spring-biased coupling members 8 and 9 enable an operator to properly attach the magazine even when the toothed portions 8a, 9a are not immediately in accurate registry with the toothed portions 5c, 6c.

The speed-regulating centrifugal switch 63 may be replaced by suitable resistors without departing from the spirit of our invention. The locking bolt 31 insures that the magazine 2 is safely held in requisite position when the reel 5 or 6 is driven at a high speed during rewinding.

When the magazine 2 is properly attached to the housing 1 and fills the recess 1a in the side wall 1A, the entire apparatus resembles a rather flatbox-shaped body which occupies little room and comprises a minimal number of projecting parts. The compactness of the apparatus is further enhanced by mounting the mirror 19 in the interior of the magazine 2.

Each reel may be provided with two or more notches 5d or 6d.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a cinematographic apparatus, particularly in a motion picture projector, a housing; a magazine removably mounted on said housing; a pair of reels rotatably mounted in said magazine for carrying convoluted film; opening means in said magazine in the region of convoluted film carried by said reels; drive means provided in said housing for rotating said reels so that a supply of convoluted film on one of said reels is being transferred onto the other reel; arresting means provided in said housing and operative to arrest said drive means; and control means for operating said arresting means, including a scanning member mounted on said housing and adjacent said opening means so as to track through said opening means one edge face of convoluted film and to operate said arresting means when the length of convoluted film is reduced to a predetermined minimum value.

2. A structure as set forth in claim 1, wherein said scanning member comprises a roller which tracks said one edge face of convoluted film and is movable axially of said one reel and wherein said roller tracks the innermost convolution of film on said one reel.

3. A structure as set forth in claim 2, wherein said one reel is a flangeless reel and is provided with a recess adjacent to said innermost convolution to receive at least a portion of said roller in response to partial unwinding of such innermost convolution whereby said roller operates said arresting means.

4. A structure as set forth in claim 1, further comprising a movable supporting member for said scanning member, said supporting member being mounted in said housing and said scanning member extending through registering openings provided in said housing and said magazine and into the interior of the magazine.

5. A structure as set forth in claim 1, further comprising coupling means for connecting said drive means with said reels in response to mounting of said magazine on said housing, said coupling means comprising first coupling portions provided on said reels and complementary coupling portions mounted in said housing and operatively connected with said drive means.

6. A structure as set forth in claim 5, wherein each of said reels comprises a core and said first coupling portions consist of teeth provided on the end faces of the respective cores, said second coupling portions comprising spring-biased coupling members axially movably mounted in said housing and having teeth movable into mesh with the teeth of the respective cores.

7. A structure as set forth in claim 1, further comprising second arresting means for said drive means and a second scanning member mounted in said housing and adjacent said other reel to track one edge face of convoluted film and to operate said second arresting means when the length of convoluted film on said other reel is reduced to a predetermined minimum value.

8. A structure as set forth in claim 7, wherein said drive means comprises a reversible electric motor and each of said arresting means comprises a normally closed microswitch which is connected in the circuit of said motor and is opened by the corresponding scanning member when the length of convoluted film on the respective reel is reduced to said minimum value.

9. A structure as set forth in claim 8, wherein the circuit of said motor further comprises speed-selecting means and actuating means for said speed-selecting means.

10. A structure as set forth in claim 9, wherein said actuating means comprises a knob rotatably mounted on said housing and said circuit further comprises a plurality of fixed contacts and movable contacts connected with said knob and rotatable into current-conducting engagement with selected fixed contacts, said motor having two poles and said microswitches being connected with one of said poles.

11. A structure as set forth in claim 8, wherein said circuit further comprises a source of electrical energy and a control switch for reversing said motor.

12. A structure as set forth in claim 11, wherein said control switch is arranged to reverse said motor while bypassing said speed-selecting means.

13. A structure as set forth in claim 11, further comprising a claw pull-down mounted in said housing to advance the film and blocking means operatively connected with said control switch for blocking said pulldown in response to reversing of said motor.

14. A structure as set forth in claim 9, further comprising locking means operated by said actuating means for locking said magazine to said housing in response to starting of said motor.

15. A structure as set forth in claim 7, wherein said drive means comprises a reversible electric motor and each of said arresting means comprises a normally closed switch connected in the circuit of said motor, each of said scanning members comprising a roller which is movable axially of the respective reel and enters a notch provided in the corresponding reel in response to partial withdrawal of the innermost convolution on such reel.

References Cited

UNITED STATES PATENTS

| | | | |
|---|---|---|---|
| 2,661,164 | 12/1953 | Badmaieff | 242—57 X |
| 2,676,212 | 4/1954 | Williams | 179—100.2 |
| 3,051,405 | 8/1962 | Lyon | 242—55.12 |
| 3,102,699 | 9/1963 | Proctor | 242—55.14 |

LEONARD D. CHRISTIAN, *Primary Examiner.*